United States Patent [19]
Iten et al.

[11] 3,893,113
[45] July 1, 1975

[54] TRACKING RECEIVER

[75] Inventors: Paul D. Iten, Oberrohrdorf; Jiri Mastner, Niederrohrdorf, both of Switzerland

[73] Assignee: BBC Brown Boveri & Company Limited, Baden, Switzerland

[22] Filed: Dec. 18, 1973

[21] Appl. No.: 425,841

[30] Foreign Application Priority Data
Dec. 27, 1972 Switzerland.................. 18859/72

[52] U.S. Cl.................................. 343/7 A; 343/8
[51] Int. Cl.................................. G01s 9/44
[58] Field of Search..................... 343/7 A, 8

[56] References Cited
UNITED STATES PATENTS
| | | | |
|---|---|---|---|
| 3,295,127 | 12/1966 | Kross | 343/7 A |
| 3,343,160 | 9/1967 | Beals et al. | 343/7 A |
| 3,680,092 | 7/1972 | Scott | 343/7 A |

*Primary Examiner*—T. H. Tubbesing
*Attorney, Agent, or Firm*—Pierce, Scheffler & Parker

[57] ABSTRACT

A tracking receiver particularly for use in the radar art for determining the frequency of Doppler signals in laser-Doppler flow probes includes a voltage-controlled oscillator the control voltage of which is varied during search operations until the frequency of the converted input signal comes to lie in the band pass of an intermediate frequency stage and so produces in a frequency discriminator a regulating voltage for the voltage-controlled oscillator and with a threshold-value logic controlled by a peak-value detector connected to the intermediate-frequency stage for switching over the output of the frequency discriminator depending upon the intermediate frequency signal. Switching over of the frequency discriminator takes place only when the output signal from the intermediate frequency stage approaches the peak value of the output signal stored during the preceding search operation covering the whole tuning range of the receiver, or reaches a specific fraction of the peak value.

4 Claims, 4 Drawing Figures

TRACKING RECEIVER

The present invention relates to an improvement in a tracking receiver with a voltage-controlled oscillator, wherein the control voltage is varied during the searching operation until the frequency of the converted input signal comes to lie in the pass band of the intermediate-frequency stage and so produces, in a frequency discriminator, a regulating voltage for the frequency regulation, and with a threshold-value logic for switching over the output of the frequency discriminator depending on the intermediate-frequency signal.

Tracking receivers are used in particular in the radar art, particularly when determining the frequency of Doppler signals in laser-Doppler flow probes and the present invention will be later explained, by way of comparison with a known type of tracking receiver for a Doppler radar system and the accompanying drawings wherein.

Figure 1:
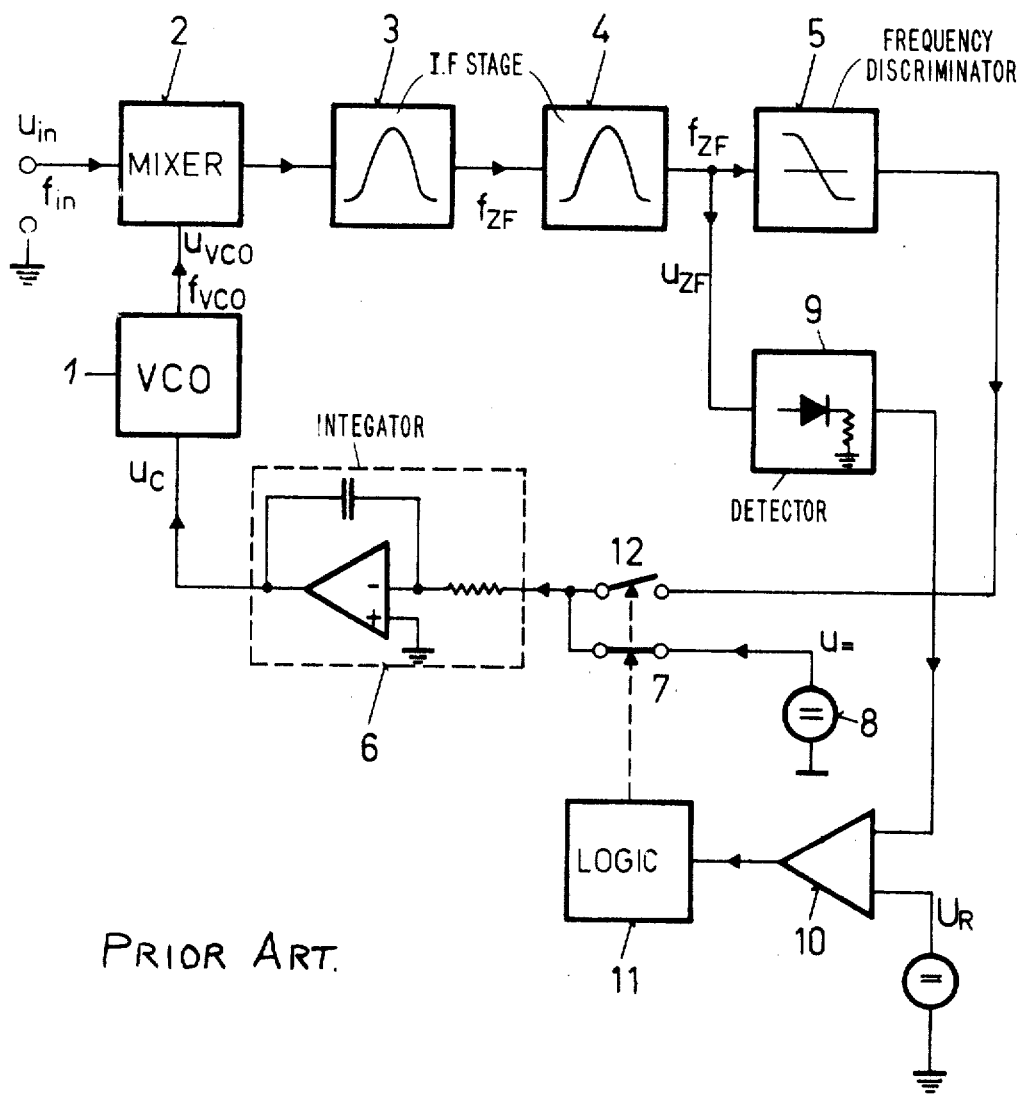
FIG. 1 is a simplified block schematic circuit diagram of a known tracking receiver for a doppler radar system.

As background for the present invention, reference is now made to the doppler radar system illustrated in FIG. 1. This system was demonstrated on the occasion of the 17th National Aerospace Instrumentation Symposium of the Instrument Society of America, May 10th-12th, 1971, Las Vegas, Nevada. It consists essentially of a superheterodyne receiver, the oscillator 1 of which can be detuned by a control voltage $U_C$. The input signal $U_{in}$ having the frequency $f_{in}$ is mixed in the mixer stage 2 with the signal $f_{vco}$ from the oscillator 1 and amplified in one or more intermediate-frequency stages 3, 4 having a band-pass characteristic. With a correctly tuned oscillator $$f_{ZF} = f_{vco} - f_{in} \tag{1}$$

then applies (or also $f_{ZF} = f_{vco} + f_{in}$, depending on design). Since $f_{ZF}$ are constant and known, $f_{vco}$ is a direct measure of the frequency $f_{in}$ of the input signal $U_{in}$.

In order that equation (1) may be fulfilled, during tracking operation, the output of the frequency discriminator 5, the center frequency of which corresponds to the precise desired value of $f_{ZF}$, is connected to the input of an integrator 6. The latter may also be a proportional amplifier. The integrator supplies said control voltage $U_C$ for the oscillator 1. Thus, the frequency control loop is closed and the frequency of the oscillator 1 is readjusted so that the voltage zero is reached at the output of the frequency discriminator 5 (or approaches zero in the case of a proportional amplifier).

In order that the closed-loop control may be effective, it is necessary for the deviation of the oscillator frequency $f_{vco}$ from the correct value to lie within such limits that the mixed frequency $(f_{vco} - f_{in})$ still lies within the pass band of the intermediate-frequency stage or stages and hence also within the frequency range of the frequency discriminator 5. In the event of greater deviations of $f_{vco}$, no signal comes through the intermediate-frequency stages and the output voltage of the frequency discriminator 5 remains zero, regardless of the magnitude of the frequency error.

If signal frequency $f_{in}$ is unknown, therefore, a search procedure is necessary during which the oscillator frequency $f_{vco}$ is varied continuously until the mixed signal comes within the frequency range of the intermediate-frequency stages.

In the known system, this search procedure is realized by the fact that either the frequency of the oscillator 1 is varied by hand or a sawtooth voltage is supplied to the oscillator 1. This is indicated diagrammatically in FIG. 1: A constant voltage $U_-$, originating from a voltage source 8, is supplied to the integrator 6 through a switch 7. The output voltage $U_C$ of the integrator rises until a signal appears at the output of the intermediate-frequency stage. This signal is rectified in a detector 9 and compared with a minimum desired value by means of a comparator 10. The comparator 10 then controls the switches 7 and 12 through a logic system 11, as a result of which the integrator input is connected to the output of the frequency discriminator and at the same time the voltage source 8 is disconnected from the integrator input.

This known system only works satisfactorily, however, if the following two conditions are satisfied:

a. the signal-noise ratio (SNR) is high enough,
b. apart from the signal to be measured (Doppler frequency), the input signal only contains spurious signals of relatively low amplitude which cannot switch through the comparator.

Actually, if apart from the signal to be measured, the input signal spectrum also contains further (discrete) frequencies of relatively large amplitude, for example, interference by powerful broadcasting transmitters, then the tracking receiver tracks the first frequency which it finds during the search operation. In this manner, it may happen that an interference component is "measured" while the actual useful signal has a much greater amplitude than the interference component.

The known device also fails when there is much noise because then signals of sufficient signal amplitude are constantly present at the input of the comparator regardless of the oscillator frequency $f_{vco}$. The tracking receiver then tracks any noise component, which leads to haphazard measuring data.

It is the object of the present invention to provide a tracking receiver of the kind referred to at the beginning, which does not have the disadvantages of known systems and wherein the requirements regarding the signal to be measured are as low as possible. In particular, a tracking receiver is to be provided wherein the only condition for the signal to be measured is that its amplitude is greater than that of the interference component(s), provided that the signal-to-noise ratio lies within reasonable limits.

According to the invention, the above-mentioned problem is solved by the fact that the threshold-value logic is so constructed and disposed that the switching over of the output of the frequency discriminator only takes place when the output signal of the intermediate-frequency stage is approaching the peak value of said output signal, stored during the preceding search operation covering the whole tuning range of the tracking receiver, or reaches a specific fraction of said peak value.

In the tracking receiver according to the invention, the entire search operation with following frequency locking, takes place in two phases:

During the first phase, the local oscillator (VC) runs through the whole tuning range. By means of a peak detector connected to the output of the intermediate-frequency stage, it is found how great is the amplitude of the strongest signal (= the one to be measured) in the whole range covered. This value is stored.

In the second phase, the local oscillator again begins to run through the range. In the course of this, the output signals from an instantaneous-value detector connected to the output of the intermediate-frequency stage are compared, by means of a comparator, with the peak value stored during the first search operation. Only on the reappearance of the strongest signal is the frequency discriminator switched over to tracking.

If the second phase has remained unsuccessful for any reason, for example, because of loss of signal after the end of the first phase, the whole procedure is repeated from the beginning.

The whole course of the procedure is controlled by a logic which is controlled by said comparator for the comparison of instantaneous and peak values.

A first embodiment of the invention will now be explained with reference to FIG. 2 wherein those components of the tracking receiver which correspond to like components in the prior art receiver construction of FIG. 1 have been assigned the same reference numerals in order to provide a clearer comparison between the two. As in the receiver circuit of FIG. 1, the tracking receiver consists of local oscillator 1, a mixer stage 2, one or more intermediate-frequency stages 3 and 4, a frequency discriminator 5, the voltage source 8 with following integrator 6 for producing the control signal $U_C$ for the local oscillator 1, as well as the switches 7 and 12 for the selective connection of said voltage source, or of the frequency discriminator, to the integrator, controlled by the logic 11, which latter will be described later. As in FIG. 1, here too the output of the intermediate-frequency stage 4 is connected to an instanteousvalue detector 9, the output of which is connected to the input of the comparator 10. The capacitor 13 serves to filter out brief fluctuations in voltage (ripple). The time constant of the instantaneous-value detector extended by this capacitor is short in comparison with the search time.

As distinct from what is known, the reference input of the comparator 10 is not connected to a fixed voltage $U_R$ but to a voltage $k.U_S$, $k < 1$, derived from the peak value $U_S$ of the preceding search operation and stored in a peak-value detector 14. For this purpose, the peak-value detector 14 is connected to the output of the intermediate-frequency stage 4. It is followed by a voltage follower 15. A specific, adjustable fraction $k$ ($k < 1$) of the stored peak voltage is supplied to the reference input of the comparator 10 by means of the voltage divider 16, 17.

Figure 2:
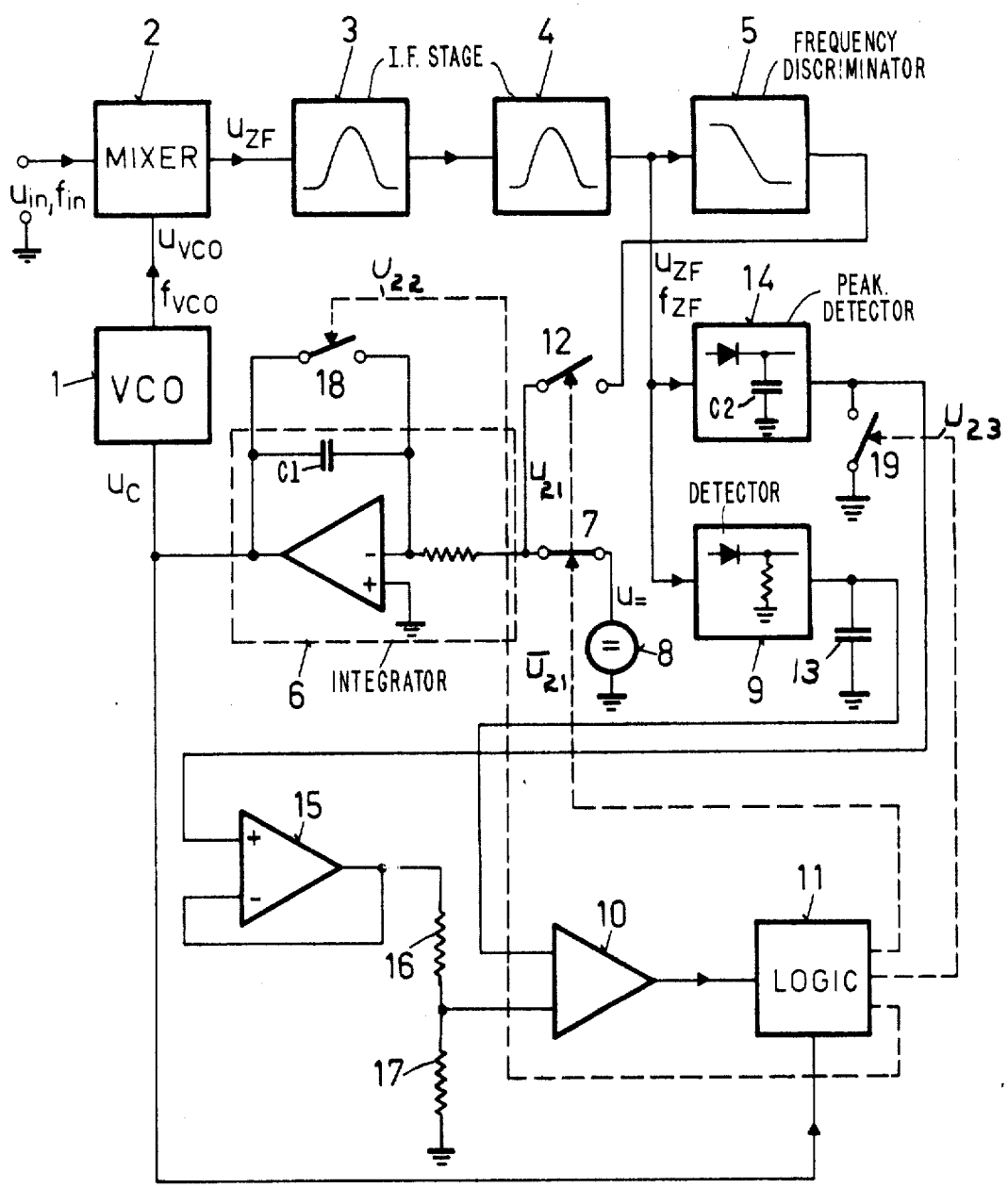
FIG. 2 is also a block schematic circuit diagram of a tracking receiver according to a first embodiment of the invention.

As a further difference, the tracking receiver as shown in FIG. 2 comprises switches 18, 19 for discharging the integrator 6 and the peak-voltage store respectively, formed from the peak-value detector 14 and voltage follower 15.

The logic 11 to be described in detail later, acts on the switches 7, 12, 18 and 19, as indicated by broken action lines.

The mode of operation of the tracking receiver shown in FIG. 2 is apparent from the following:

At the beginning of the first phase, the logic 11 closes the switches 18 and 19 for a short time; as a result, the corresponding capacitors C1 and C2 are discharged (initial conditions for the integrator 6 and the peak-voltage detector 14). Switch 7 connects the integrator input to the voltage source 8. Switch 12 is open. A sawtooth voltage $U_C$ appears at the output of the integrator 6 and tunes the whole tuning range of the local oscillator 1. At the end of the first phase, a voltage which corresponds to the amplitude of the strongest signal in the whole input spectrum is available at the output of the peak-value detector 14 or at the output of the voltage follower 15. The logic 11 also prevents the closing of the switch 12 during this first phase.

At the beginning of the second phase, the logic 11 discharges the integrator 6 through the switch 18 but leaves the peak-value detector 14 in the previous state (storage mode). The local oscillator 1 is again controlled by the sawtooth voltage $U_C$. During this second search operation, the output voltage of the instantaneous-value detector 9 is now compared with a preselected fraction, for example 70 %, determined by the voltage divider 16, 17, of the stored peak value, by means of the comparator 10. As soon as the output voltage of the instantaneous-value detector 9 becomes greater than said value, the logic 11 interrupts the further rise of the output voltage $U_C$ of the integrator, in that the switch 7 is opened. At the same time the switch 12 is actuated and the tracking loop of the receiver is thus closed.

For the search operation in this second phase, the rise of the output voltage of the instantaneous-value detector 9 above said fraction of the peak value stored during the preceding search operation means that the receiver is again tuned almost precisely to the strongest signal in the input spectrum. The signal to be measured now lies with certainty within the band width of the intermediate-frequency or frequency discriminator. The local oscillator 1 is rapidly readjusted to the frequency at which the output voltage of the frequency discriminator becomes zero (intermediate frequency equal to desired value). From this moment on, the tracking loop (frequency regulation for the local oscillator 1) is effective, that is to say the receiver automatically follows a frequency varying in time.

Figure 3:
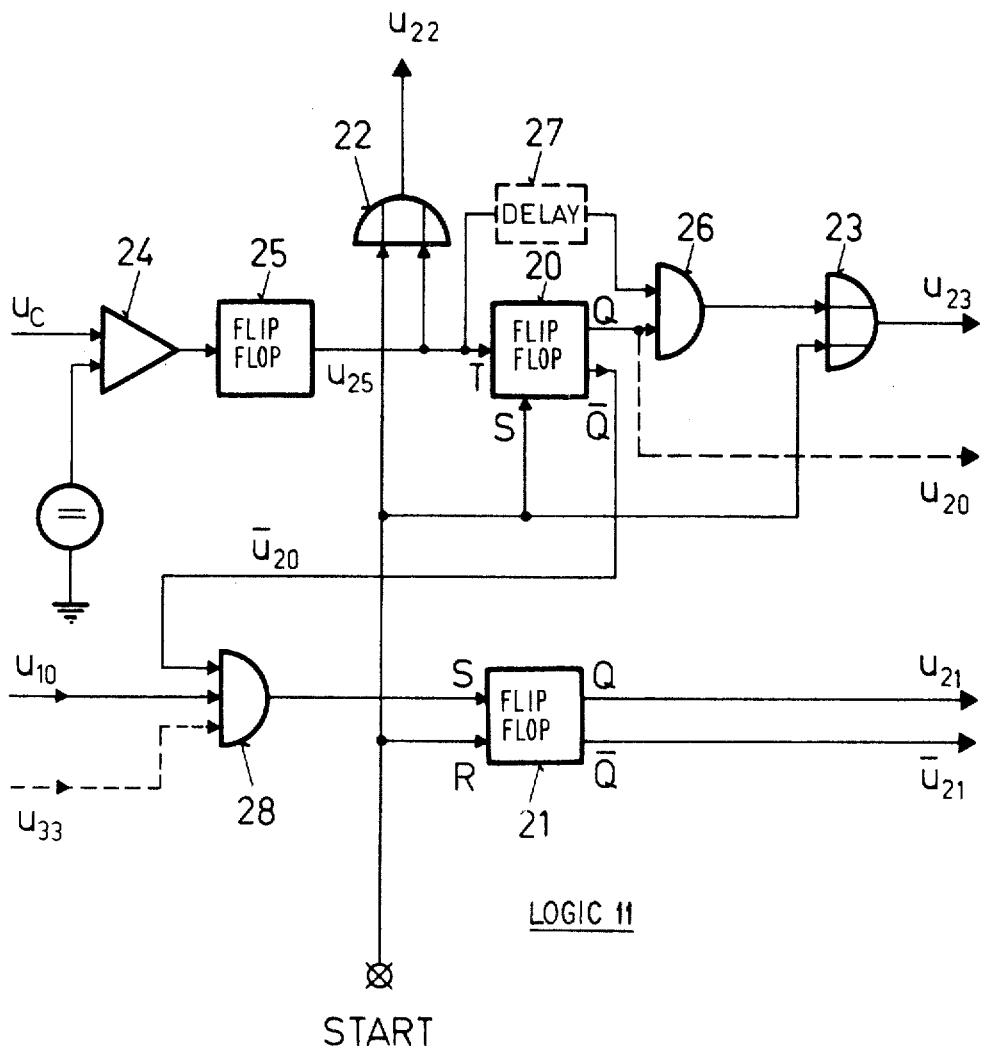
FIG. 3 is a block schematic circuit diagram of a logic for controlling a whole period of time in which a signal is processed in the receiver as illustrated in FIG. 2.

One example of an embodiment of the logic 11 is illustrated in FIG. 3. A positive logic is presupposed: the (electronic) switches 7, 12, 18, 19 are switched through when the corresponding voltages actuating them reach the logical 1. The components in FIG. 3 are conventional switching circuits of the digital art and are preferably used in the form of integrated circuits. The voltages appearing in the device shown in FIG. 3 are designated in accordance with the following plan: $U_i$ =output voltage of the switching circuit $i$. $\bar{U}_i$ signifies the logical complement of $U_i$.

The mode of operation of the circuit arrangement shown in FIG. 3 and its cooperation with the tracking receiver shown in FIG. 2 is described below.

By means of a start signal at the input, the toggle flip-flop 20 is set (Q=1), the set-reset flip-flop 21 is reset (Q=0). In addition, the switches 18 and 19 are actuated through the OR gates 22 and 23 and so the integrator 6 and the peak-value detector 14 are discharged (FIG. 2). Switch 7 (FIG. 2) is closed, switch 12 is open. After the end of the start signal, the integrator 6 begins to integrate the voltage $U_-$. The greatest amplitude in the input spectrum is stored in the peak-value detector 14. As soon as the output voltage $U_C$ of the integrator has reached the maximum value $U_{max}$ (determined by the voltage of the voltage source connected to the reference input of the comparator 24), (end of the first phase), the comparator 24 triggers a single-shot flip-flop 25. The output pulse $U_{25}$ of this flip-flop discharges the integrator 6 through the OR gate 22. At the same time, the toggle flip-flop 20 changes over ($\bar{Q}=1$). No $U_{23}$ pulse arrives through the AND gate 26 because the AND condition is not fulfilled. A possible edge coincidence can be eliminated if necessary by a delay stage 27; the latter is drawn in broken lines in the line connecting single-shot flip-flop 25 to the AND gate 26.

After the end of the $U_{25}$ pulse, the integrator 6 again begins to integrate the voltage $U_-$. As soon as the voltage at the output of the instantaneous-value detector 9 exceeds the voltage value at the resistor 17 of the voltage divider 16, 17 (FIG. 2), (= signal found), the comparator 10 alters its output voltage $U_{10}$ to logical 1. Because the toggle flip-flop 20 is now in the state $\bar{Q}=1$, the set-reset flip-flop 21 is set through the AND gate 28 ($Q=1$, $\bar{Q}=0$). As a result, the switch 7 is opened, the switch 12 closed, as a result of which the regulating loop circuit is closed.

If the second phase had taken place unsuccessfully (signal disappeared after the first phase), the integrator 6 would integrate the voltage $U_-$ without hindrance until the comparator 24 detected the maximum value $U_{max}$. Then the output pulse $U_{25}$ of the single-shot flip-flop 25 discharges the integrator 6 through the OR gate 22. At the same time, the toggle flip-flop 20 changes back into the state $Q=1$. Since the AND condition is now fulfilled at the AND gate 26, the peak-value detector 14 is also discharged through the switch 19. In this manner, all the initial conditions for the logic are restored and the first phase is repeated. This operation (first and second phase) is repeated until the signal has been found.

As was stated at the beginning, the measurement may fail with an extremely poor signal-to-noise ratio. This can be avoided by a minor modification to the tracking receiver and the associated logic. This is illustrated by way of example in FIG. 4.

Figure 4:
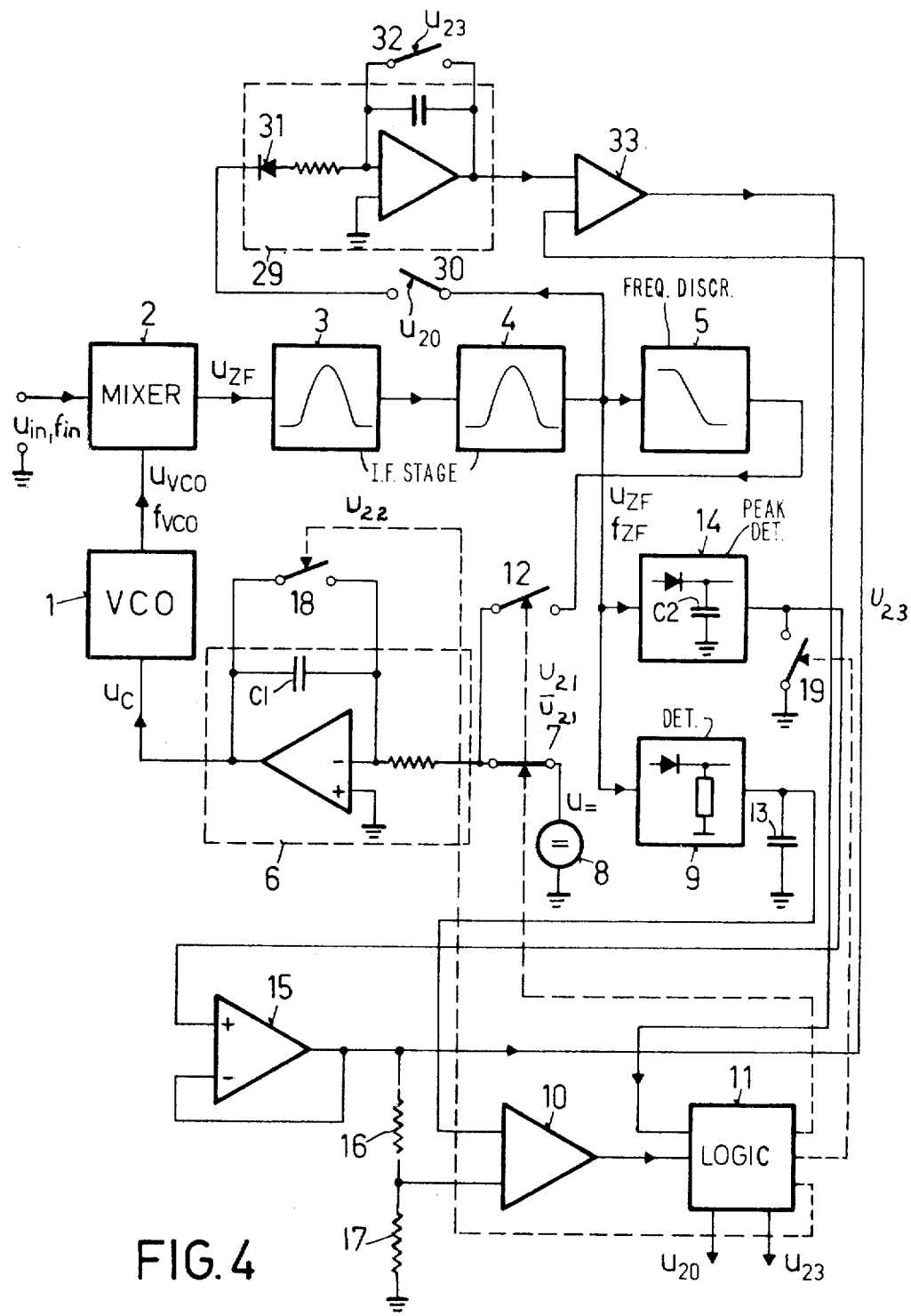
FIG. 4 is a block schematic circuit diagram of a tracking receiver in accordance with a second embodiment of the invention with an auxiliary device for monitoring the signal-to-noise ratio.

The arrangement of FIG. 4 differs from that illustrated in FIG. 2 by a further integrator with following comparator. The integrator 29 is connected to the output of the intermediate-frequency stage 4 through a switch 30 and a diode 31. The switch 32 serves to discharge the integrator, the output of which is connected to the reference input of the comparator 33, while the other input of the comparator 33 is connected to the output of the voltage follower 15.

The switches 30 and 32 are actuated by the logic which is illustrated in FIG. 3 and which has been modified in the following manner. The AND gate 28 now has three inputs. The output signal $U_{33}$ of the comparator 33 is supplied to this input. The switch 30 is controlled by the Q-output of the toggle flip-flop 20. The switch 32 is controlled by the output pulse $U_{23}$ from the OR gate 23, that is to say simultaneously with the switch 19 which discharges the peak-value detector 14.

The mode of operation of the circuit arrangement, thus modified, of a tracking receiver with additional SNR monitoring is apparent from the following:

At the beginning of the first phase of the search operation, the integrator 29 is discharged by $U_{23}$ pulse by means of switch 32. During the whole of the first phase, the switch 30 is closed because $U_{20}=1$. The integrator 29 integrates the output signal $U_{ZF}$ from the intermediate-frequency stage 4. Because the local oscillator 1 is running through the whole spectrum of the receiving range, at known speed, in the course of this, the output voltage $U_{29}$ of the integrator 29 at the end of the first phase is $$U_{29} = \int_0^T U(f)\,dt = \text{const.} \cdot \int_{f_{min}}^{f_{max}} U(f)\,dt$$

and is therefore proportional to signal and noise in the receiving range ($f_{min} \leq f \leq f_{max}$). The contribution of the signal to the value of the integrated noise is practically negligible because of the narrow signal line so that the output voltage $U_{29}$ of the integrator can be regarded as proportional only to the noise. Since, at the end of the first phase, the information regarding the signal amplitude (to be measured) is present at the output of the peak-value detector 14, the signal-to-noise ratio can be found by comparison between this information and the output voltage of the integrator (comparator 33). The output signal $U_{33}$ from the comparator is supplied to the AND gate 28. In this case, therefore, it is only possible to switch over to tracking if not only the strongest signal has been found again but also at the same time the signal-to-noise ratio is above a prescribed upper limit. The selection of this limit, that is to say the decision regarding tracking or not, can be made for example (with known parameters $U_-$ and time constant of the integrator 6), by dimensioning the integration time constant of the integrator 29.

During the second phase of the search operation, the switches 30 and 32 are open.

If the signal-to-noise ratio is checked by other means, for example, by means of a spectrum analyzer, to which the input signal is supplied, the logical decision signal-to-noise ratio "good" or "bad" can be supplied manually from the outside in the form of a voltage corresponding to the logical 1 for example, instead of from the output of the comparator 33 to the input of the AND gate 28.

We claim:

1. A tracking receiver comprising a mixer, a voltage-controlled oscillator having its output connected as one input to said mixer and the input signal connected as the other input to said mixer, an intermediate frequency stage having a pass band and which is connected to the output from said mixer, a frequency discriminator connected to the output from said intermediate frequency stage and which produces at its output a variable control voltage connected to said oscillator for varying the output frequency thereof during a search operation until the frequency of the output signal from said mixer comes to lie in the pass band of said intermediate frequency stage, an instantaneous-value detector connected to the output of said intermediate frequency stage, a peak-value detector also connected to the output of said intermediate frequency stage for storing the peak value of the output therefrom, a comparator for comparing the outputs from said instantaneous and peak-value detectors, and means including switching means disposed in the connection between the output from said frequency discriminator and said oscillator for switching over the discriminator when the instantaneous output signal from said intermediate frequency stage approaches or reaches a specific fraction of the peak value of its signal stored in said peak-value detector during the preceding search operation covering the whole tuning range of the receiver.

2. A tracking receiver as defined in claim 1 and wherein said means for switching over said frequency discriminator includes a logic connected between the output from said comparator and said switching means, said logic being controlled by the comparator output and by said control voltage of said oscillator.

3. A tracking receiver as defined in claim 1 and which further includes means deriving a control signal dependent upon the signal-to-noise ratio and means utilizing said control signal to also control said switching means.

4. A tracking receiver as defined in claim 3 wherein said means deriving a control signal dependent upon the signal-to-noise ratio comprises an integration network in which is stored the entire noise component of the input spectrum passing through said intermediate frequency stage and further comprising means for comparing a voltage corresponding to said stored noise with a voltage corresponding to the peak value of the output voltage of the intermediate frequency stage stored during the same search operation.

* * * * *